(12) United States Patent
Hsu et al.

(10) Patent No.: US 8,696,186 B2
(45) Date of Patent: Apr. 15, 2014

(54) LIGHT BAR STRUCTURE AND LIGHT SOURCE DEVICE

(75) Inventors: Chih-Hua Hsu, New Taipei (TW); Pin-Hung Hsu, New Taipei (TW); Jung-Shiung Liau, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 0 days.

(21) Appl. No.: 13/452,937

(22) Filed: Apr. 23, 2012

(65) Prior Publication Data
US 2013/0021790 A1    Jan. 24, 2013

(30) Foreign Application Priority Data
Jul. 19, 2011    (TW) .............................. 100125429 A

(51) Int. Cl.
*F21S 4/00*        (2006.01)
*G09F 13/18*      (2006.01)

(52) U.S. Cl.
USPC ........................ 362/612; 362/249.02; 362/634

(58) Field of Classification Search
USPC ................. 362/249.02, 217.1, 612, 634, 97.3
See application file for complete search history.

(56) References Cited

U.S. PATENT DOCUMENTS

| | | | |
|---|---|---|---|
| 6,305,109 B1 * | 10/2001 | Lee | ................................... 40/546 |
| 7,170,751 B2 * | 1/2007 | Mayer | ........................... 361/719 |
| 7,674,010 B2 * | 3/2010 | Griffiths et al. | ........... 362/249.02 |
| 8,092,038 B2 * | 1/2012 | Liao et al. | ................... 362/217.1 |
| 8,142,048 B2 * | 3/2012 | Risley, Sr. | ................... 362/217.1 |
| 2008/0106892 A1 | 5/2008 | Griffiths | |
| 2010/0135029 A1 | 6/2010 | Risley, Sr. | |
| 2012/0236598 A1 * | 9/2012 | Germain et al. | ............... 362/612 |

OTHER PUBLICATIONS

Office action mailed on Nov. 19, 2013 for the Taiwan application No. 100125429, filing date: Jul. 19, 2011, p. 1 line 13~14, p. 2 line 1~24 and p. 3 line 7~12.

* cited by examiner

*Primary Examiner* — Peggy A. Neils
(74) *Attorney, Agent, or Firm* — Winston Hsu; Scott Margo

(57) ABSTRACT

A light bar structure is disclosed in the present invention. The light bar structure includes a housing whereinside an accommodating space is formed, and the accommodating space is for accommodating a light unit. The light bar structure further includes a first buckling component disposed on an inner side of the accommodating space. The buckling component includes a first base disposed on a bottom inside the housing for supporting the light unit, a first arm connected to the first base and disposed on a first lateral wall inside the housing, and a first constraining portion disposed on the first arm for contacting against the light unit, so as to constrain a movement of the light unit relative to the first base.

22 Claims, 5 Drawing Sheets

LIGHT BAR STRUCTURE AND LIGHT SOURCE DEVICE

BACKGROUND OF THE INVENTION

1. Field of the Invention

The present invention relates to a light bar structure and a light source device, and more particularly, to a light bar structure and a light source device having low material cost and manufacturing cost without utilizing surface mount technology.

2. Description of the Prior Art

Surface mount technology (SMT) is utilized to fix the light emitting diode on the base in the conventional light bar structure. The conventional base can be made of aluminum material or copper material. Material cost and manufacturing cost of the aluminum base is expensive and has great heat dissipating efficiency, so that the aluminum base is usually applied for high power light emitting diode, such as panel with large dimensions or huge monitor. Cost of the copper base (FR4 plate) is cheaper than the aluminum base, and the copper base has normal heat dissipating efficiency, so the copper base is usually applied for low power light emitting diode. However, the light emitting diode has to be fixed on the aluminum base and the copper base by the surface mount technology, so that the conventional light bar structure has drawbacks of expensive manufacturing cost and complicated production process. Thus, design of a light bar structure having easy assembly and low cost is an important issue of the panel industry.

SUMMARY OF THE INVENTION

The present invention provides a light bar structure and a light source device having low material cost and manufacturing cost without utilizing surface mount technology for solving above drawbacks.

According to the claimed invention, a light bar structure includes a housing whereinside an accommodating space is formed, and the accommodating space is for accommodating a light unit. The light bar structure further includes a first buckling component disposed on an inner side of the accommodating space. The first buckling component includes a first base disposed on a bottom inside the housing for supporting the light unit, a first arm connected to the first base and disposed on a first lateral wall inside the housing, and a first constraining portion disposed on the first arm for contacting against the light unit, so as to constrain a movement of the light unit relative to the first base.

According to the claimed invention, the housing comprises a protrusion disposed on the first lateral wall for engaging with the first constraining portion, so as to constrain a movement of the first constraining portion.

According to the claimed invention, a hole is formed on the bottom of the housing, the first buckling component further comprises an engaging portion disposed on an end of the first base for engaging with the hole.

According to the claimed invention, a direction of the first base is different from a direction of the first arm, and the first buckling component is a L-shaped structure.

According to the claimed invention, the light bar structure further includes a second buckling component disposed the other inner side of the accommodating space and opposite to the first buckling component. The second buckling component includes a second base disposed on the bottom inside the housing for supporting the light unit with the first base, a second arm connected to the second base and disposed on a second lateral wall inside the housing opposite to the first lateral wall, and a second constraining portion disposed on the second arm for contacting against the light unit, so as to constrain a movement of the light unit relative to the second base.

According to the claimed invention, the first buckling component is made of conductive material for contacting an electrode of the light unit.

According to the claimed invention, the first buckling component further includes a contacting portion disposed on the first base for buckling the light unit with the first constraining portion.

According to the claimed invention, an opening is formed on the bottom of the housing.

According to the claimed invention, a slot is formed on the first base, a plurality of sections on the first base is separated by the slot, and each section is for supporting the corresponding light unit.

According to the claimed invention, the housing comprises a block disposed on a position of the bottom adjacent to the slot on the first base.

According to the claimed invention, a light source device includes a light unit, and a light bar structure for fixing the light unit and transmitting beams generated from the light unit to an optical plate. The light bar structure includes a housing whereinside an accommodating space is formed, and the accommodating space is for accommodating a light unit. The light bar structure further includes a first buckling component disposed on an inner side of the accommodating space. The first buckling component includes a first base disposed on a bottom inside the housing for supporting the light unit, a first arm connected to the first base and disposed on a first lateral wall inside the housing, and a first constraining portion disposed on the first arm for contacting against the light unit, so as to constrain a movement of the light unit relative to the first base.

The present invention does not utilize the conventional surface mount technology to fix the light unit on the light bar structure. The light bar structure and the light source device of the present invention has advantages of simple structure, easy assembly, low material cost and manufacturing cost. Heat dissipating efficiency and optical efficiency of the light emitting diode are not decreased with assembly of the light bar structure of the prevent invention, so that the present invention can be applied on the side-in backlight module and the direct-type backlight module.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
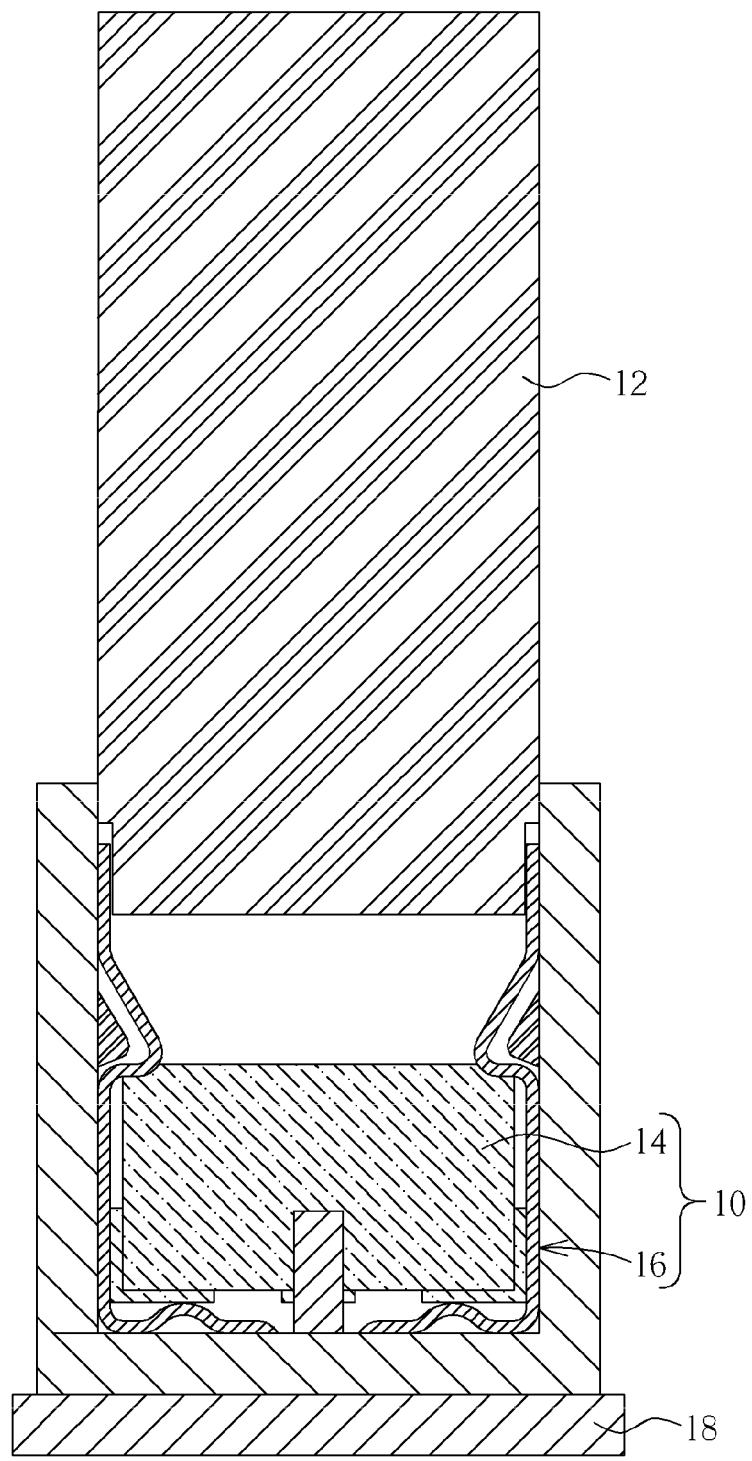
FIG. 1 and FIG. 2 are diagrams of a light source device in different applications according to an embodiment of the present invention.
Figure 2:
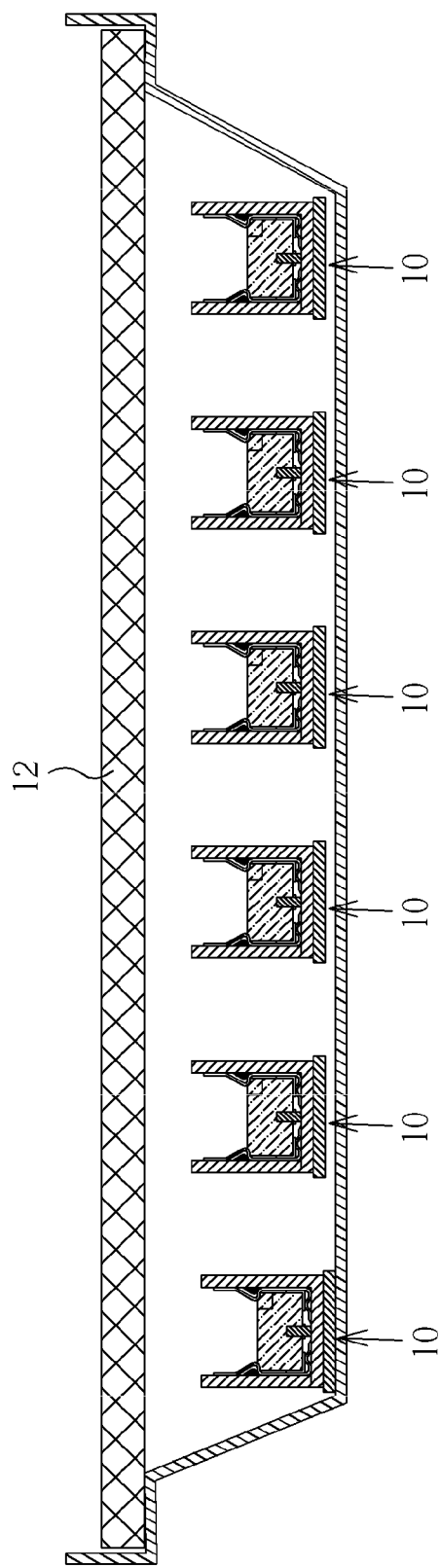

Please refer to FIG. 1 and FIG. 2. FIG. 1 and FIG. 2 are diagrams of a light source device 10 in different applications according to an embodiment of the present invention. As shown in FIG. 1, the light source device 10 can be disposed by a side of an optical plate 12 (such as a light guiding plate) for forming a side-in backlight module. As shown in FIG. 2, the light source device 10 can be disposed under the optical plate 12 for forming a direct-type backlight module. The light source device 10 can be for transmitting beams with the optical plate 12 (such as a diffusion plate). The light source device 10 includes a plurality of light units 14 and a light bar structure 16. The light unit 14 can be a light emitted diode (LED), and the light bar structure 16 can be for fixing the plurality of LEDs, so as to transmit beams generated from the LEDs to the optical plate 12. The light source device 10 can further selectively includes a heat dissipating plate 18 disposed on the bottom of the light bar structure 16. Heat generated by each light unit 14 can transmit to the heat dissipating plate 18 via the light bar structure 16 for dissipating the heat effectively, so as to increase operating efficiency and service life of the light unit 14.

Figure 3:
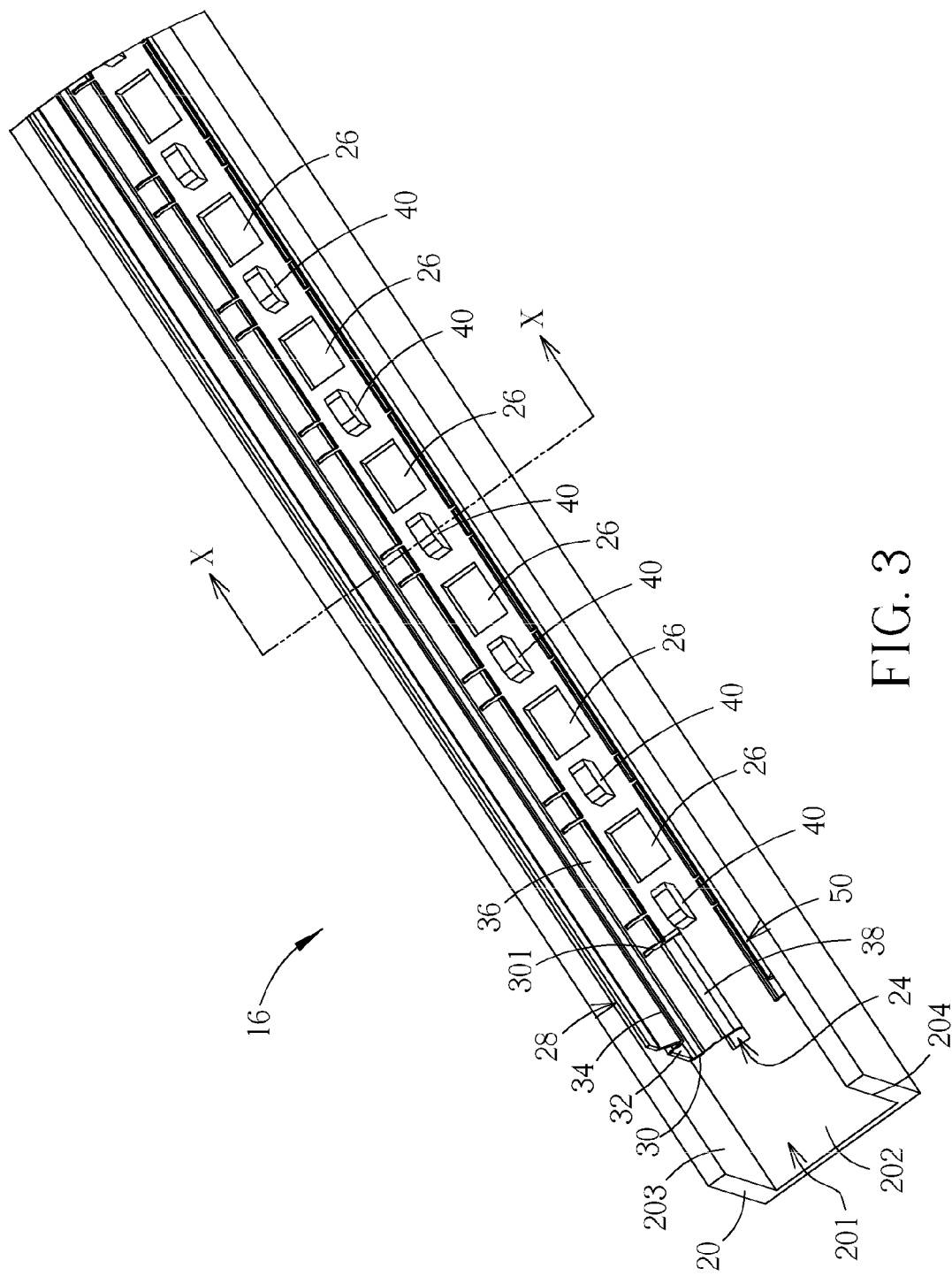
FIG. 3 is a diagram of a light bar structure according to the embodiment of the present invention.
Figure 4:
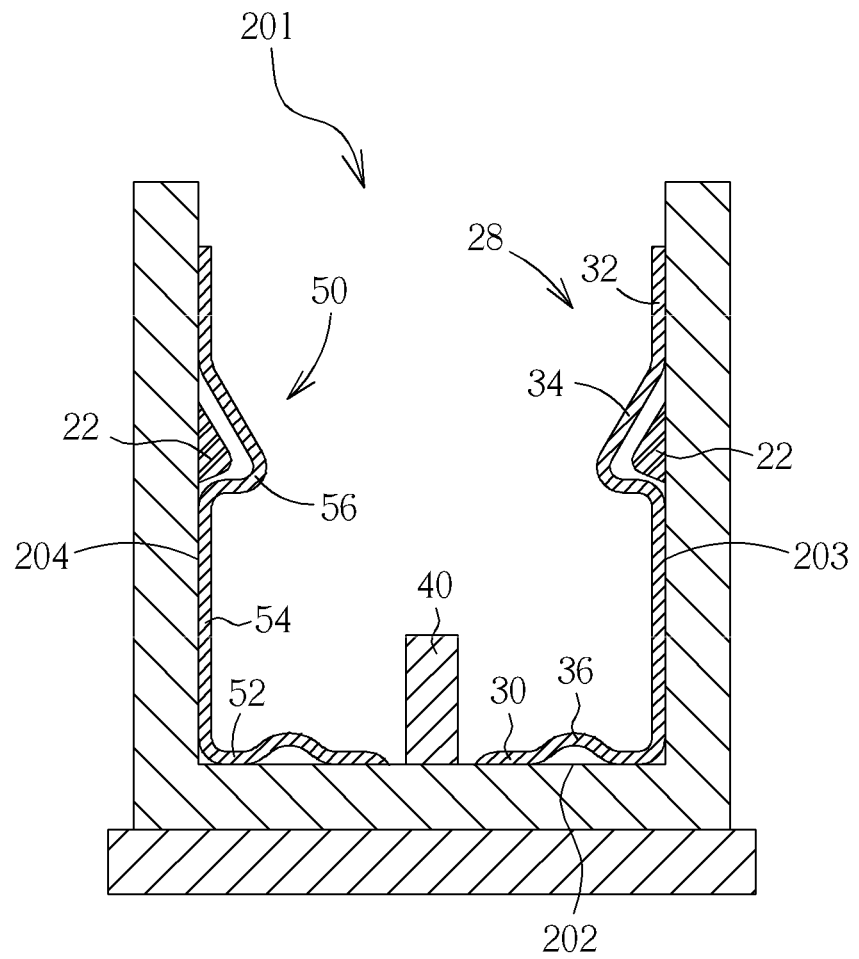
FIG. 4 is a sectional view of the light bar structure along X-X line according to the embodiment of the present invention.

Please refer to FIG. 3 and FIG. 4. FIG. 3 is a diagram of the light bar structure 16 according to the embodiment of the present invention. FIG. 4 is a sectional view of the light bar structure 16 along X-X line according to the embodiment of the present invention. The light bar structure 16 includes a housing 20 whereinside an accommodating space 201 is formed. The accommodating space 201 can be for accommodating the plurality of light units 14. Generally, the housing 20 can be made of isolating material, such as plastic material. The accommodating space 201 inside the housing 20 can include a bottom 202, a first lateral wall 203 and a second lateral wall 204. The bottom 202 intersects the first lateral wall 203 and the second lateral wall 204, and the first lateral wall 203 faces and is substantially parallel to the second lateral wall 204. As shown in FIG. 4, the housing 20 can be a U-shaped structure. The housing 20 can include two protrusions 22 respectively disposed on the first lateral wall 203 and the second lateral wall 204. A plurality of holes 24 and a plurality of openings 26 can be formed on the bottom 202 of the housing 20. The plurality of holes 24 can be respectively formed on a position of the bottom 202 adjacent to two sides. The plurality of openings 26 can be respectively formed on a position of the bottom 202 corresponding to each light unit 14. Each opening 26 can be filled with thermal compound, so that the heat generated by the light unit 14 can transmit to the heat dissipating plate 18 via the thermal compound for increasing heat dissipating efficiency.

The light bar structure 16 further includes two buckling components with identical structures and functions, and the two buckling components are respectively disposed on two opposite inner sides of the accommodating space 201, which means that the two buckling components are respectively disposed on the first lateral wall 203 and the second lateral wall 204. The light bar structure 16 of the present invention can further utilize one buckling component to fix the light unit 14 inside the housing 20, the related application depends on design demand, and detailed description is omitted herein for simplicity. In this embodiment, the light bar structure 16 utilizes two buckling components to buckle two sides of the light unit 14 for balanced force application and stable clamp. The light bar structure 16 includes a first buckling component 28 and a second buckling component 50. The first buckling component 28 includes a first base 30 disposed on the bottom 202 inside the housing 20, a first arm 32 connected to the first base 30 and disposed on the first lateral wall 203 inside the housing 20, a first constraining portion 34 disposed on the first arm 32 and engaged with the protrusion 22, and a contacting portion 36 disposed on the first base 30. The first base 30 can be for supporting the light unit 14. The first constraining portion 34 can be for contacting against the light unit 14, and the contacting portion 36 can be for buckling the light unit 14 with the first constraining portion 34, so as to constrain a movement of the light unit 14 relative to the first base 30. Because the first constraining portion 34 is engaged with the protrusion 22, the first constraining portion 34 do not move relative to the housing 20, so that the light unit 14 can be fixed inside the accommodating space 201 of the housing 20 by the first buckling component 28. It should be mentioned that the first constraining portion 34 and the contacting portion 36 can be made of resilient material for respectively buckling the upper side and the low side of the light unit 14, so as to prevent the light unit 14 from separating from the accommodating space 201 when the light bar structure 16 is hit accidentally.

In addition, as shown in FIG. 3, the first buckling component 28 can further include two engaging portions 38 respectively disposed on two ends of the first base 30. Each engaging portion 38 can be engaged with the corresponding hole 24 on the housing 20 for fixing the first buckling component 28 inside the accommodating space 201 on the housing 20. That is to say, the holes 24 can be the positioning holes for installing the first buckling component 28, so as to ensure that the first buckling component 28 can be fixed at the correct position inside the housing 20. Therefore, the first buckling component 28 can be fixed inside the housing 20 by interference of the first constraining portion 34 and the protrusion 22, and interference of the engaging portion 38 and the hole 24.

As shown in FIG. 3 and FIG. 4, a direction of the first base 30 is different from a direction of the first arm 32. For example, the first buckling component 28 can be a L-shaped structure when the direction of the first base 30 is substantially perpendicular to the direction of the first arm 32, and the L-shaped structure can be for buckling the light unit 14 for preventing the light unit 14 from separating via an opening of the U-shaped structure (housing 20). A plurality of slots 301 can be formed on the first base 30, and the first base 30 can be divided into a plurality of sections by the slots 301. When the plurality of light units 14 is installed inside the light bar structure 16, each light unit 14 can be disposed on the corresponding section. In addition, structural rigidity of the first base 30 can be decreased by the slots 301, which means that the slot 301 not only can be a reference for assembling the light unit 14 easily, but also can increase resilient intensity of the first buckling component 28 for installing the light unit 14 rapidly and conveniently. Furthermore, the housing 20 can further includes a plurality of blocks 40 respectively disposed on a position of the bottom 202 adjacent to each slot 301 on the first base 30. The block 40 can isolate the adjacent light units 14 for preventing the light units 14 from collision.

Figure 5:
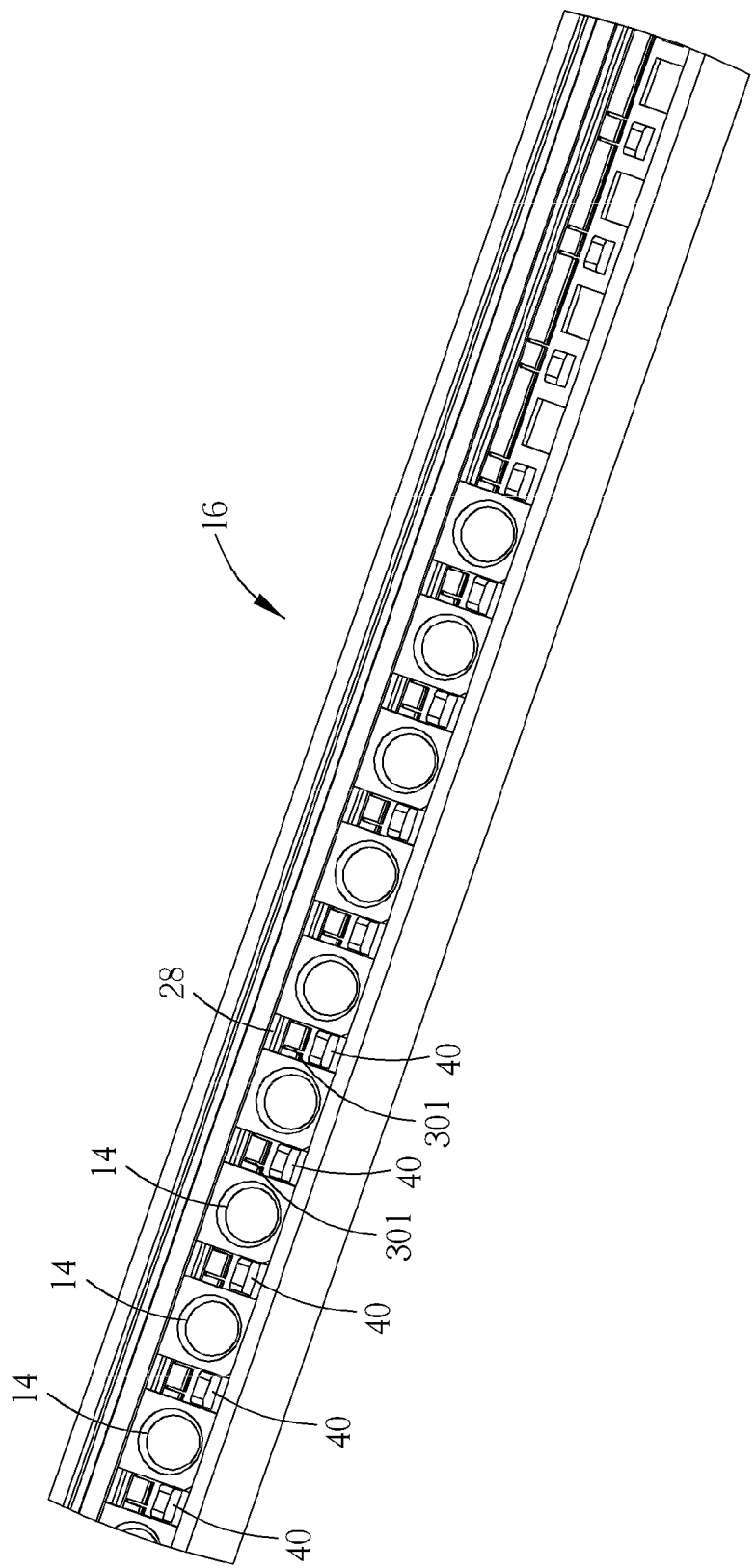
FIG. 5 is an assembly diagram of a light unit and the light bar structure according to the embodiment of the present invention.

Please refer to FIG. 3 to FIG. 5. FIG. 5 is an assembly diagram of the light unit 14 and the light bar structure 16 according to the embodiment of the present invention. The other buckling component (the second buckling component 50) of the light bar structure 16 of the present invention can be for stably buckling the light unit 14 with the first buckling component 28. As shown in FIG. 4, the second buckling component 50 can include a second base 52 disposed on the bottom 202 of the housing 20, a second arm 54 connected to the second base 52 and disposed on the second lateral wall 204 inside the housing 20, and a second constraining portion 56 disposed on the second arm 54. The second buckling component 50 can further includes the slot, the contacting portion and the engaging portion, structures and functions of the second buckling component 50 are the same as ones of the first buckling component 28, and detailed description is omitted herein for simplicity. It should be mentioned that the first buckling component 28 and the second buckling component 50 can be made of conductive material. When the plurality of light units 14 is installed inside the housing 20, as shown in FIG. 4 and FIG. 5, the first buckling component 28 and the second buckling component 50 can be electrically connected to the positive electrode and the negative electrode of each light unit 14, respectively, so that the plurality of light units 14 can be combined in a parallel connection by the light bar structure 16 for increasing utility rate of service voltage and decreasing attrition rate of power.

In conclusion, the present invention utilizes the first buckling component and the second buckling component to respectively buckle two sides of each light unit, so as to fix the light unit inside the housing for forming the light bar structure. Each buckling component (the first buckling component or the second buckling component) can be for constraining the movement of the arm and the base relative to the housing by the constraining portion and the engaging portion. The constraining portion and the contacting portion of the buckling component can be mad of the resilient material, so that the buckling components can cover the light unit tightly by resilient deformation when the light unit is installed inside the light bar structure. In addition, the base, the arm, the constraining portion, the contacting portion and the engaging portion of each buckling component can be integrated monolithically, and the buckling component can be made of the conductive material (metal material), so that the two buckling components can be the conductive components for the plurality of light units in the parallel connection. Therefore, the two buckling components are disposed on two inner sides of the housing, the positive electrode and the negative electrode of each light unit can be electrically connected to the two buckling components, respectively, for forming the parallel connection, and the light bar structure can further utilize the housing made of isolation material for preventing the light unit from electric leakage. Besides, the light bar structure can utilize the buckling component made of metal material to dissipate heat generated from the light unit when the light unit is the low power light emitting diode. The plurality of openings can be formed on the hosing. Heat generated from the light unit, which is the high power light emitting diode, can transmit to the heat dissipating plate via the thermal compound inside the hole, so as to increase heat dissipating efficiency of the light source device and to increase service life of the light bar structure and the light unit.

Comparing to the prior art, the present invention does not utilize the conventional surface mount technology to fix the light unit on the light bar structure. The light bar structure and the light source device of the present invention has advantages of simple structure, easy assembly, low material cost and manufacturing cost. Heat dissipating efficiency and optical efficiency of the light emitting diode are not decreased with assembly of the light bar structure of the prevent invention, so that the present invention can be applied on the side-in backlight module and the direct-type backlight module.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light bar structure comprising:
a housing where inside an accommodating space is formed, and the accommodating space being for accommodating a light unit, the housing comprises a protrusion disposed on a first lateral wall inside the housing; and
a first buckling component disposed on an inner side of the accommodating space, the first buckling component comprising:
a first base disposed on a bottom inside the housing for supporting the light unit;
a first arm connected to the first base and disposed on the first lateral wall inside the housing; and
a first constraining portion disposed on the first arm for engaging with the protrusion and contacting against the light unit, so as to constrain a movement of the first constraining portion and a movement of the light unit relative to the first base.

2. The light bar structure of claim 1, wherein a hole is formed on the bottom of the housing, the first buckling component further comprises an engaging portion disposed on an end of the first base for engaging with the hole.

3. The light bar structure of claim 1, wherein a direction of the first base is different from a direction of the first arm, and the first buckling component is a L-shaped structure.

4. The light bar structure of claim 1, further comprising:
a second buckling component disposed the other inner side of the accommodating space and opposite to the first buckling component, the second buckling component comprising:
a second base disposed on the bottom inside the housing for supporting the light unit with the first base;
a second arm connected to the second base and disposed on a second lateral wall inside the housing opposite to the first lateral wall; and
a second constraining portion disposed on the second arm for contacting against the light unit, so as to constrain a movement of the light unit relative to the second base.

5. The light bar structure of claim 1, wherein the first buckling component is made of conductive material for contacting an electrode of the light unit.

6. The light bar structure of claim 1, wherein the first buckling component further comprises:
a contacting portion disposed on the first base for buckling the light unit with the first constraining portion.

7. The light bar structure of claim 1, wherein an opening is formed on the bottom of the housing.

8. The light bar structure of claim 1, wherein at least one slot is formed on the first base, a plurality of sections on the first base is separated by the slot, and each section is for supporting the corresponding light unit.

9. The light bar structure of claim 8, wherein the housing comprises a block disposed on a position of the bottom adjacent to the slot on the first base.

10. A light source device comprising:
a light unit; and
a light bar structure for fixing the light unit and transmitting beams generated from the light unit to an optical plate, the light bar structure comprising:
a housing where inside an accommodating space is formed, and the accommodating space being for accommodating the light unit, the housing comprises a protrusion disposed on a first lateral wall inside the housing; and
a first buckling component disposed on an inner side of the accommodating space, the first buckling component comprising:
a first base disposed on a bottom inside the housing for supporting the light unit;
a first arm connected to the first base and disposed on the first lateral wall inside the housing; and a first constraining portion disposed on the first arm for engaging with the protrusion and contacting against the light unit, so as to constrain a movement of the first constraining portion and a movement of the light unit relative to the first base.

11. The light source device of claim 10, wherein a hole is formed on the bottom of the housing, the first buckling component further comprises an engaging portion disposed on an end of the first base for engaging with the hole.

12. The light source device of claim 10, wherein the light bar structure further comprises:
   a second buckling component disposed the other inner side of the accommodating space and opposite to the first buckling component, the second buckling component comprising:
      a second base disposed on the bottom inside the housing for supporting the light unit with the first base;
      a second arm connected to the second base and disposed on a second lateral wall inside the housing opposite to the first lateral wall; and
      a second constraining portion disposed on the second arm for contacting against the light unit, so as to constrain a movement of the light unit relative to the second base.

13. The light source device of claim 10, wherein the first buckling component further comprises:
   a contacting portion disposed on the first base for buckling the light unit with the first constraining portion.

14. The light source device of claim 10, wherein an opening is formed on the bottom of the housing, the light source device further comprises a heat dissipating plate, and the opening is filled with thermal compound, so as to dissipate heat generated by the light unit via the thermal compound and the heat dissipating plate.

15. The light source device of claim 10, wherein at least slot is formed on the first base, a plurality of sections on the first base is separated by the slot, and each section is for supporting the corresponding light unit.

16. The light source device of claim 15, wherein the housing comprises a block disposed on a position of the bottom adjacent to the slot on the first base.

17. A light bar structure comprising:
   a housing whereinside an accommodating space is formed, and the accommodating space being for accommodating a light unit; and
   a first buckling component disposed on an inner side of the accommodating space, the first buckling component comprising:
      a first base disposed on a bottom inside the housing for supporting the light unit;
      a first arm connected to the first base and disposed on a first lateral wall inside the housing;
      a first constraining portion disposed on the first arm for contacting against the light unit, so as to constrain a movement of the light unit relative to the first base; and
      a contacting portion disposed on the first base for buckling the light unit with the first constraining portion.

18. The light bar structure of claim 17, wherein a hole is formed on the bottom of the housing, the first buckling component further comprises an engaging portion disposed on an end of the first base for engaging with the hole.

19. The light bar structure of claim 17, further comprising:
   a second buckling component disposed the other inner side of the accommodating space and opposite to the first buckling component, the second buckling component comprising:
      a second base disposed on the bottom inside the housing for supporting the light unit with the first base;
      a second arm connected to the second base and disposed on a second lateral wall inside the housing opposite to the first lateral wall; and
      a second constraining portion disposed on the second arm for contacting against the light unit, so as to constrain a movement of the light unit relative to the second base.

20. The light bar structure of claim 17, wherein an opening is formed on the bottom of the housing.

21. The light bar structure of claim 17, wherein at least one slot is formed on the first base, a plurality of sections on the first base is separated by the slot, and each section is for supporting the corresponding light unit.

22. The light bar structure of claim 21, wherein the housing comprises a block disposed on a position of the bottom adjacent to the slot on the first base.

* * * * *